July 8, 1941.  J. EGGERT ET AL  2,248,904
PROCESS OF COPYING LENTICULAR FILMS
Filed June 18, 1937
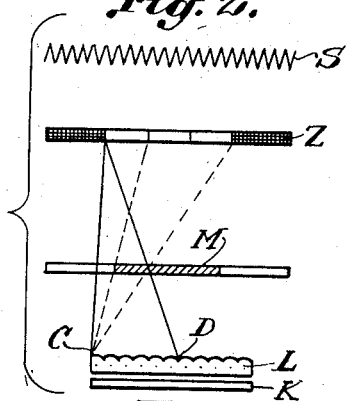
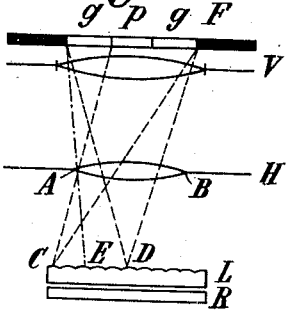
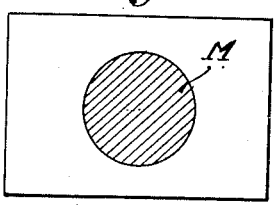
John Eggert
Gerd Heymer
Inventors
By Their Attorneys Patented July 8, 1941

2,248,904

UNITED STATES PATENT OFFICE 2,248,904

PROCESS OF COPYING LENTICULAR FILMS

John Eggert, Leipzig, and Gerd Heymer, Wolfen, Kreis Bitterfeld, Germany, assignors to I. G. Farbenindustrie Aktiengesellschaft, Frankfort-on-the-Main, Germany Application June 18, 1937, Serial No. 148,846
In Germany June 25, 1936

2 Claims. (Cl. 95—75)

The present invention relates to lenticular films.

One of its objects is to provide a process for copying lenticular films. Further objects will be seen from the detailed specification following hereafter. Reference is made to the accompanying drawing by which the invention is illustrated.

It is known practice in copying component color pictures from lenticular films on to non-lenticular photographic material to use a compensation filter film for compensating differences of brightness of the copying material; in this manner the differences of brightness arising in the production or reproduction of the component color pictures are compensated. Such compensation filter films may be made, for example, by photographing for each component picture by means of the optical system used for producing or reproducing the component color picture and under the same conditions as those under which the component color picture was taken or is to be reproduced, a white or grey non-colored surface is photographed on a light-sensitive layer and this exposure is developed and fixed. In a simultaneous copying of several component color pictures from the lenticular film it is in many cases also necessary to equalize differences of brightness in the copying.

In the copying of lenticular films according to this invention in which a lenticular film serving as copy is illuminated on the lenticular surface there is arranged at that position at which the rear lens of the objective stood in the exposure of the original film a compensation filter which partially absorbs the copying light in the form of a disc of which the diameter and distance from the film agree with the diameter and distance from the film of the aperture of the rear lens of the exposure objective, whereby the light is so absorbed that the darkening of the margin of the picture produced by the vignetting effect is removed.

The process is in general suitable for all lenticular screen processes in which the copying process the original lens screen is illuminated through diaphragms on the lenticular surface, there being inserted in the diaphragm necessary a color filter. The method is adopted with advantage, for example, when from exposures on lenticular films or from exposures on lenticular bi-packs, as described in U. S. Patent No. 1,968,944, patented August 7, 1934 copies are made on multi-layer color subtractive films in which the individual differently colored layers have a spectral sensitivity and the original is illuminated by means of color diaphragms. The compensation filter disc comprises a light absorbing material of a strength which depends on the optical data of the exposure objective and the exposure filter.

The process is also applicable with illumination of the film from the lower side if the copying is by means of the objective which involves less vignetting than that produced by the exposure objective. In this case, too, a grey disc provided with a certain blackening is so arranged that the distance and diameter, if desired the apparent distance and diameter, are of the same value as they were in the exposure.

The following example and the diagram serve to illustrate the invention, but they are not intended to limit it thereto.

A lenticular bi-pack is exposed to an objective of 5 cm. aperture. L is the lenticular front film and R is the rear film. In front of the objective and, indeed, directly in front of the front lens V is a filter consisting of a purple middle strip and two yellow side strips. The virtual image of this filter, as it appears through the objective if the film is viewed through this, lies at F. The purple middle strip is marked $p$, the two yellow strips $g$. The filter image is completely visible from the lenticular front film and, indeed, from its middle point D through the rear lens H, the limits of which are marked AB. From the edge C of the picture field, however, the filter image F is no longer wholly visible, but only one yellow filter strip is included through the rear lens AB. Since, owing to the arrangement of the filter of the lenticular bi-pack the images of the two yellow filter strips under the lenticulations, overlap, the effect of the one filter strip is merely a diminution of the brightness to one half. Between this position and a point E, if one proceeds from the edge towards the middle of the field, the whole filter is fully visible without any covering and the brightness rises from half to the full value.

In the attached sheet of drawings, Fig. 1 illustrates relationships during exposures, Fig. 2 shows a copying arrangement in accordance with the example in the present disclosure, and Fig. 3 is a top view of the compensation filter.

S is the source of light, Z is the diaphragm, L is the lenticular film, K is the copying film (plane film) and M the middle portion of the compensation filter which is in lieu of the rear lens (H in Fig. 1) of the objective. This middle portion is circular and evenly blackened so that the passing light is diminished down to a fraction $a$ of its original intensity. The surrounding portion of the filter is practically completely transparent. Points C and D correspond to those in Fig. 1.

According to the invention in copying the exposed lenticular front film a diaphragm is arranged at the same distance and of the same size as in the exposure and having openings corresponding with the filter surfaces of the exposure material. These openings are either uncovered to an extent corresponding with the one component color whereby the single component color picture can be eliminated from the lenticular film or they remain, if one copies as described in U. S. Patent No. 1,874,529, patented August 30, 1932, simultaneously open without introduction of the filter. The diaphragm openings can, however, also be provided with filters, the colors of which may, if desired, differ from those of the exposure filter, so that each of the corresponding component color pictures is produced only in one layer of the copying film which is sensitive for the respective filter color. In all these cases in which exposure of the lenticular film is from the lenticular side there is arranged between the diaphragm and the film a compensation filter, for example a glass disc on which a blackening in the form of a circle of the same diameter as that of the rear lens of the exposure objective is arranged. The blackening may be produced photographically or by hand. The movements due to the fine adjustment of the objective may be disregarded. The size of the blackening depends on the strength of the shadowing of the filter strips and corresponds in general with the strongest damping of the light in consequence of the vignetting.

If, for example, at the point C of the picture field the brightness is diminished to one half, in the copying process it must be to the same extent greater than, for example, for the middle D of the picture field. If the transmission factor of the blackened disc is $\alpha$ the sum of the undiminished intensity of light $J$ which now freely falls on C through the filter field uncovered during the exposure and the intensity multiplied by the factor $\alpha$ of the filter strip which was free in the exposure amounts to double the intensity of the two filter strips at the middle D multiplied by $\alpha$, therefore of the equation:

$$J + \alpha J = 2.2 \alpha J$$

from which it follows $\alpha = \tfrac{1}{2}$, that is to say the disc must have a blackening corresponding with a photographic density $S = \log 1/\alpha =$ about 0.48.

The process is applicable so long as the intensity of a component color does not completely fall to nil.

What we claim is:

1. In a process for copying a lenticular film onto a photographic material by means of multicolor filter, the steps which comprise arranging said elements in copying position relative to each other, passing a beam of light emanating from a light source through the multi-color filter and the lenticular film onto said photographic material, and absorbing the central rays of said light beam by means of an absorbing screen having a diameter equal to the diameter of the aperture of the rear element of the taking lens and which is spaced from said color filter and placed in the same position relative to the lenticular film as that occupied by the rear element of the taking lens, the light being absorbed to a degree sufficient to compensate for the darkening of the edge of the field which occurred when the picture was taken.

2. The process as defined in claim 1, wherein the photographic material is a multi-layer subtractive color film.

JOHN EGGERT.
GERD HEYMER.